(12) United States Patent
Stacey

(10) Patent No.: US 11,498,462 B2
(45) Date of Patent: Nov. 15, 2022

(54) CHILD SAFETY SEAT

(71) Applicant: BRITAX CHILD SAFETY, INC., Fort Mill, SC (US)

(72) Inventor: Angela M. Stacey, St. Johns (CA)

(73) Assignee: BRITAX CHILD SAFETY, INC., Fort Mill, SC (US)

(*) Notice: Subject to any disclaimer, the term of this patent is extended or adjusted under 35 U.S.C. 154(b) by 0 days.

(21) Appl. No.: 16/814,193

(22) Filed: Mar. 10, 2020

(65) Prior Publication Data
US 2020/0290489 A1 Sep. 17, 2020

Related U.S. Application Data

(60) Provisional application No. 62/817,715, filed on Mar. 13, 2019.

(51) Int. Cl.
*B60N 2/42* (2006.01)
*B60N 2/28* (2006.01)

(52) U.S. Cl.
CPC ............ *B60N 2/42* (2013.01); *B60N 2/2821* (2013.01)

(58) Field of Classification Search
CPC ........... B60N 2/42; B60N 2/28; B60N 2/2821
See application file for complete search history.

(56) References Cited

U.S. PATENT DOCUMENTS

| | | | | |
|---|---|---|---|---|
| 5,522,639 A * | 6/1996 | Jaime | ............... | B60N 2/28 297/183.3 |
| 5,664,830 A * | 9/1997 | Garcia | ............... | B60N 2/2821 297/216.11 |
| 5,730,490 A * | 3/1998 | Mortenson | ............. | A47D 13/02 297/184.11 |
| 5,806,924 A * | 9/1998 | Gonas | .................. | B60N 2/2821 297/216.11 |
| 6,669,288 B2 * | 12/2003 | Nakagawa | ........... | B60N 2/2821 297/216.11 |
| 7,219,958 B2 * | 5/2007 | Yamazaki | ............ | B60N 2/2806 297/256.13 |
| 8,905,478 B2 * | 12/2014 | Strong | ................ | B60N 2/2821 297/256.14 |
| 2009/0091167 A1 * | 4/2009 | Jha | ..................... | B60N 2/42709 297/256.12 |

* cited by examiner

*Primary Examiner* — Philip F Gabler
(74) *Attorney, Agent, or Firm* — K&L Gates LLP

(57) ABSTRACT

A child safety seat is provided. The child safety seat includes a seat shell configured to receive and secure a child therein. The seat shell includes a top portion, a base portion, and side portions operably coupling the top portion to the base portion, and the side portions are fabric or mesh. The child safety seat further includes a support frame configured to absorb energy and that defines a seat portion and backrest portion of the child safety seat to enable the child to be secured therein.

17 Claims, 15 Drawing Sheets

CHILD SAFETY SEAT

CROSS-REFERENCE TO RELATED APPLICATIONS

The present application claims priority to U.S. Provisional application No. 62/817,715 filed on Mar. 13, 2019, the contents of which are incorporated herein by reference in its entirety.

TECHNICAL FIELD

Exemplary embodiments of the present disclosure generally relate to child safety seats, and more particularly, to a child safety seat that is lightweight while employing an energy absorbing support frame.

BACKGROUND

Child safety seats (or simply child safety seats or car seats) are secured inside a vehicle to protect children in vehicles from the effects of either accidents, sudden deceleration, or other impacts or jarring events. The child safety seat may include various different protective features relating to securing the child safety seats in the vehicle, securing the child to the child safety seat, and protecting the child once the child is secured in the child safety seat. Some of these protective features may be prescribed by regulation in certain jurisdictions, but others may provide optional, additional protection for children. Due to the variety of features included on the child safety seat, and even different structural arrangements for providing many of those features, the child safety seat may be heavy to carry and uncomfortable for a child occupying the child safety seat.

BRIEF SUMMARY OF SOME EXAMPLES

Example embodiments described herein may therefore provide for a lightweight and comfortable child safety seat while still providing enhanced safety and comfort features such as energy absorption capabilities, side impact protection, and extended use from infancy through toddlerhood. In this respect, the child safety seat may have flexible mesh or fabric sides that offer greater comfort and air flow to the child seated therein while decreasing the typical weight of the child safety seat. Furthermore, the child safety seat may be configured for both base and baseless installation and have a support frame and cage frame that provide for enhanced energy absorption and side impact protection.

In one example embodiment, a child safety seat is provided. The child safety seat includes a seat shell configured to receive and secure a child therein. The seat shell includes a top portion, a base portion, and side portions operably coupling the top portion to the base portion, and the side portions are fabric or mesh. The child safety seat further includes a support frame configured to absorb energy and that defines a seat portion and backrest portion of the child safety seat to enable the child to be secured therein.

In another example embodiment, a child safety seat is provided. The child safety seat includes a base assembly configured to be operably coupled to a vehicle seat. The child safety seat further includes a seat shell configured to receive and secure a child therein. The seat shell is operably coupled to the base assembly such that the seat shell is alternately movable between, and engageable in, a plurality of positions relative to the base assembly. The seat shell includes a top portion, a base portion, and side portions operably coupling the top portion to the base portion, and the side portions are fabric or mesh. The child safety seat further includes a support frame configured to absorb energy and that defines a seat portion and backrest portion of the child safety seat to enable the child to be secured therein.

In an even further example embodiment, a base assembly of a child safety seat is provided. The base assembly operably couples a child safety seat to a vehicle seat. The base assembly includes a latch assembly configured to receive and secure a seat shell of the child safety seat in a plurality of rear-facing positions with respect to the base assembly. The latch assembly includes a plurality of latches that are configured to selectively receive rods of the seat shell. The base assembly also includes a belt tensioning assembly configured to receive a vehicle belt to tension the base assembly to the vehicle seat.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
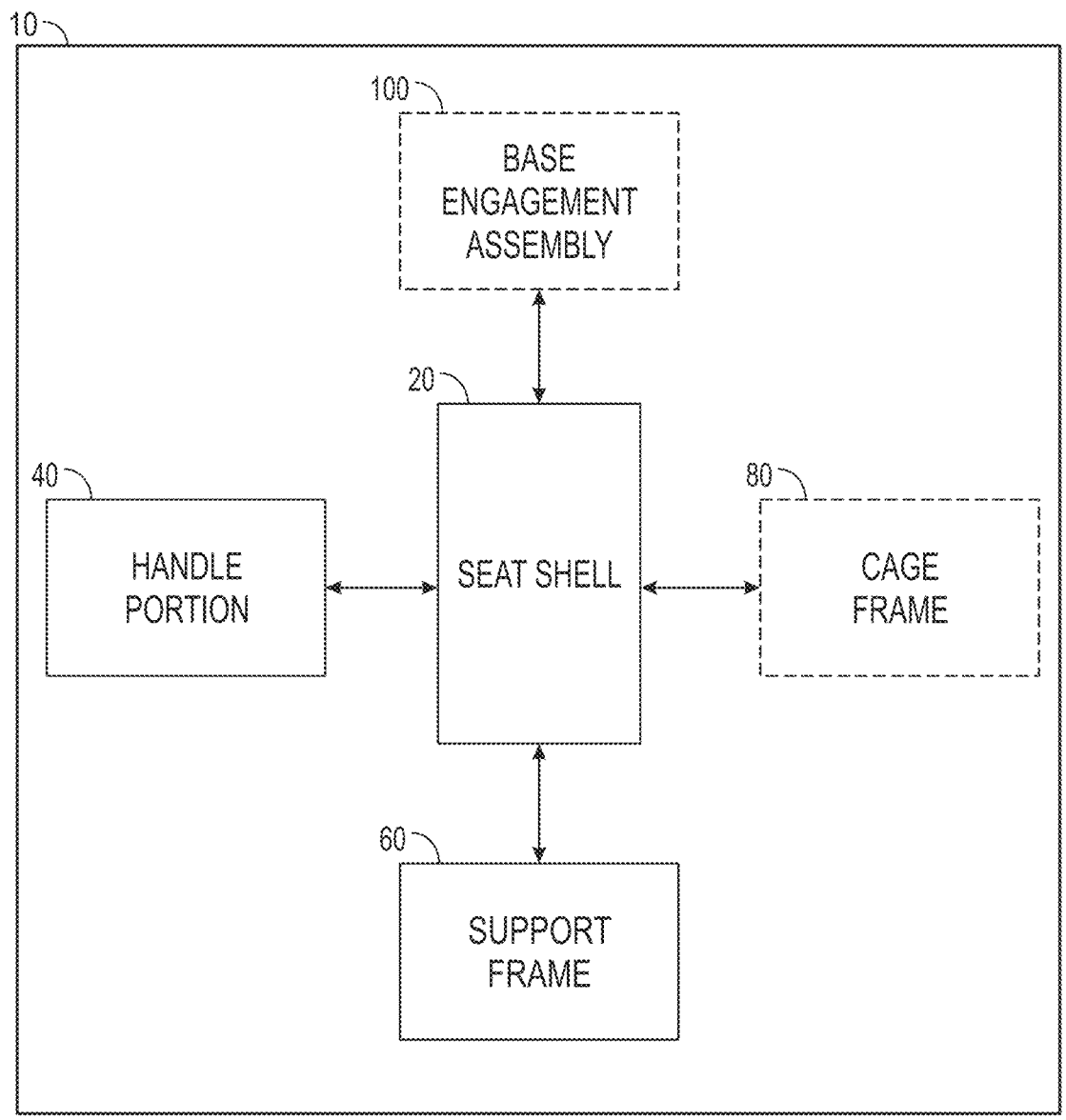
FIG. 1 illustrates a block diagram of a child safety seat according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

As discussed above, some example embodiments may provide a lightweight, safe, and comfortable child safety seat that allows for extended use of the child safety seat from infancy through toddlerhood. In accordance with example embodiments, the child safety seat may have flexible mesh or fabric sides that offer decreased weight, greater comfort, and air flow to the child occupant while still providing enhanced safety protection features such as an energy-absorbing support frame and a side protection cage frame.

Figure 2:
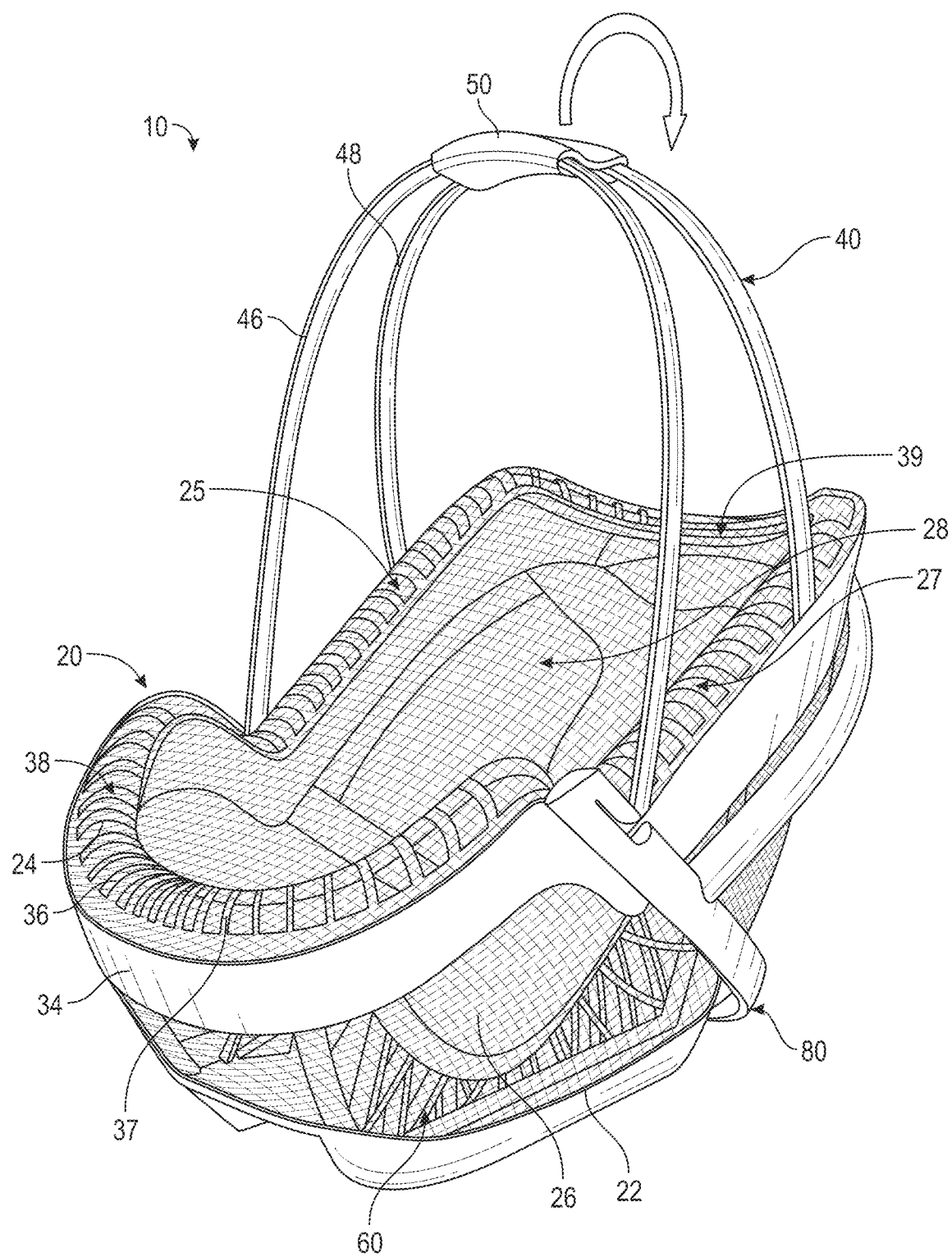
FIG. 2 illustrates a front perspective view of the child safety seat according to an example embodiment.

FIGS. 1 and 2 illustrate a child safety seat 10 according to example embodiments described herein. As shown in FIGS. 1 and 2, the child safety seat 10 may include a seat shell 20. The seat shell 20 may include components that enable an occupant (i.e., child) to be seated, secured, and supported in the child safety seat 10. In this regard as shown in FIG. 2, the seat shell 20 may include a base portion 22, a top portion 24, and side portions 26 extending between or operably coupling the base portion 22 and the top portion 24.

The base portion 22 may be a portion of the child safety seat 10 on which the child safety seat 10 is configured to be seated or rested on or, in some example embodiments, is configured to engage a base assembly 200 (see FIG. 9) for securing the child safety seat 10 in a vehicle. The base portion 22 may be formed of a plastic or similar material.

The top portion 24 may be a portion of the child safety seat 10 to which a handle portion 40 is configured to be operably coupled to and may form an opening 28 that is configured to receive the occupant. In this regard, the top portion 24 may be disposed on an opposite side of the child safety seat 10 from the base portion 22 (e.g., the top portion 24 forming an upper portion and the base portion 22 forming a bottom portion of the child safety seat 10 relative to when the child safety seat 10 is in a normal sitting position as shown in FIG. 2). The top portion 24 may form a rim around the opening 28 of the seat shell 20 to which components such as the handle portion 40 and a cage frame 80 (as further discussed below) may be coupled to. In some cases, the top portion 24 may be formed of a plastic or similar material.

Furthermore, the top portion 24 may include a first section 34 and a second section 36 that each extend around an upper portion of the child safety seat to define the opening 28. In order to ensure that the child safety seat 10 is lightweight, the first section 34 may include a plurality of ribs 37 formed of a plastic or similar material. The plurality of ribs 37 may extend around the opening 28, and each rib 37 may be spaced apart from other adjacent ribs 37 by a hollow, open space 38. These spaces 38 allow air to flow therethrough, which reduces or eliminates any unnecessary material from the child safety seat 10 thereby reducing the weight of the child safety seat 10. The second section 36 may be a solid, uniform piece formed of a plastic or similar material to allow for the handle portion 40 or the cage frame 80 to be attached thereto (as further discussed below).

As shown in FIG. 2, the handle portion 40 may be curved around the opening 28 of the child safety seat 10 defined by the top portion 24 to allow for an easy, balanced carrying of the child safety seat 10. The handle portion may include a first strap 46, a second strap 48, and a gripping member 50. In this respect, the first strap 46 and the second strap 48 are joined together proximate a center of each of the straps 46, 48 at the gripping member 50 to form the handle portion 40. It should be understood, however, that in some example embodiments that each strap 46, 48 may be formed of two separate strap portions that are coupled to the gripping member 50 in order to form the handle portion 40. Regardless of the structure of the handle portion 40, the child safety seat 10 can be carried at the gripping member 50 which enables an easy, balanced carrying of the child safety seat 10.

In some cases, the first strap 46 may have a longer length than the second strap 48 and be operably coupled to the top portion 24 proximate a midsection of the child safety seat 10. The second strap 48 may have a shorter length than the first strap 46 and be operably coupled to the top portion 24 proximate a head portion 39 of the child safety seat 10 (e.g., the position proximate where the child's head would be located when seated in the child safety seat 10). In this regard, the second strap 48 may be located closer to a head portion 39 of the child safety seat 10 than the first strap 46. The length and placement of the straps 46, 48 of the handle portion 40 allow for the straps 46, 48 to nest or overlap each other when moved to a stowed position, as further discussed below. Furthermore, each of the straps 46, 48 may have a first end that is configured to be operably coupled to a first side 25 of the top portion 24 and a second end that is configured to be operably coupled to a second side 27 of the top portion 24. In this regard, each of the straps may be curved around the opening 28 of the child safety seat 10 defined by the top portion 24 to further enable easy, balanced carrying of the child safety seat 10.

Each of the straps 46, 48 of the handle portion 40 may be pivotably attached between the first and second sides 25, 27 of the top portion 24 such that the handle portion 40 can be easily adjusted between a carrying position (shown in FIG. 2) and a stowed position. When the handle portion 40 is in the carrying position, the handle portion 40 may be suspended above the child safety seat 10 to facilitate carrying of the child safety seat 10. When the handle portion 40 is moved to the stowed position (see arrow in FIG. 2 indicating movement of the handle portion 40 from the carrying position to the stowed position), the handle portion 40 may be configured move down and rest close to or adjacent to the top portion 24 to facilitate easy insertion in and removal of the occupant from the child safety seat 10. In this respect, when the handle portion 40 is moving to the stowed position, the first strap 46 pivots in a direction toward the second strap 48 to overlap or nest with the second strap 48 and be pivoted away from the opening 28 to allow for insertion of the child into the child safety seat 10.

As further shown in FIG. 2, the seat shell 20 may include the side portions 26 that extend from the top portion 24 to the base portion 22. In other words, the side portions 26 form the sides of the child safety seat 10 with the top portion 24 forming the upper portion and the base portion 22 forming a bottom portion with respect to the child safety seat 10 being in a normal sitting position as shown in FIG. 2. Each of the side portions 26 may be formed from a fabric or mesh panel allowing for the child safety seat 10 to not only be lightweight but more breathable and comfortable for the occupant. Furthermore, in some cases, the fabric or mesh panel may be a flexible panel to enable the child safety seat 10 to conform to the occupant of the child safety seat 10. In this respect, the side portions 26 of the seat shell 20 are fabric and the only portions of the seat shell 20 made of a solid material (e.g., plastic or the like) are the top portion 24 and the base portion 24. A typical child safety seat is typically made of foam and plastic in each of the analogous top portion, bottom portion, and side portions leading to a child safety seat that is heavier and harder to carry. However, as example embodiments described herein provide for side portions 26 formed of fabric or mesh, the child safety seat 10 is not only lightweight (e.g., less than five pounds in some cases) but is also configured to conform to the occupant seated in the child safety seat 10 which makes for a more comfortable experience for the child.

As further shown in FIGS. 1-5, the child safety seat 10 may also include a support frame 60. The support frame 60 is multi-functional in that the support frame 60 may form the surface on which the occupant is supported in the child safety seat 10 while also being configured to absorb energy in the event of an impact. As shown in FIGS. 2-5, the support frame 60 may be operably coupled between each of the base portion 22 and the top portion 24. In this respect, a first end 62 of the support frame 60 may be operably coupled to a first end 30 of the top portion 24 of the child safety seat 10 and may curve around such that a second end 64 of the support frame 60 may be operably coupled to a second end 32 of the top portion 24. Furthermore, at least a portion of a bottom surface 66 of the support frame 60 may be in contact with or operably coupled to an interior surface of the base portion 22 (the interior surface of the base portion 22 being opposite from an exterior surface of the base portion 22 that is in contact with a surface when the child safety seat 10 is in a normal, sitting position). In this respect, the placement and operably coupling of the support frame 60 between the top portion 24 and the base portion 22 may maintain the position of the support frame 60 within the seat shell 20 during normal use and during an impact while the support frame 60 defines the surface for supporting the occupant.

Figure 6:
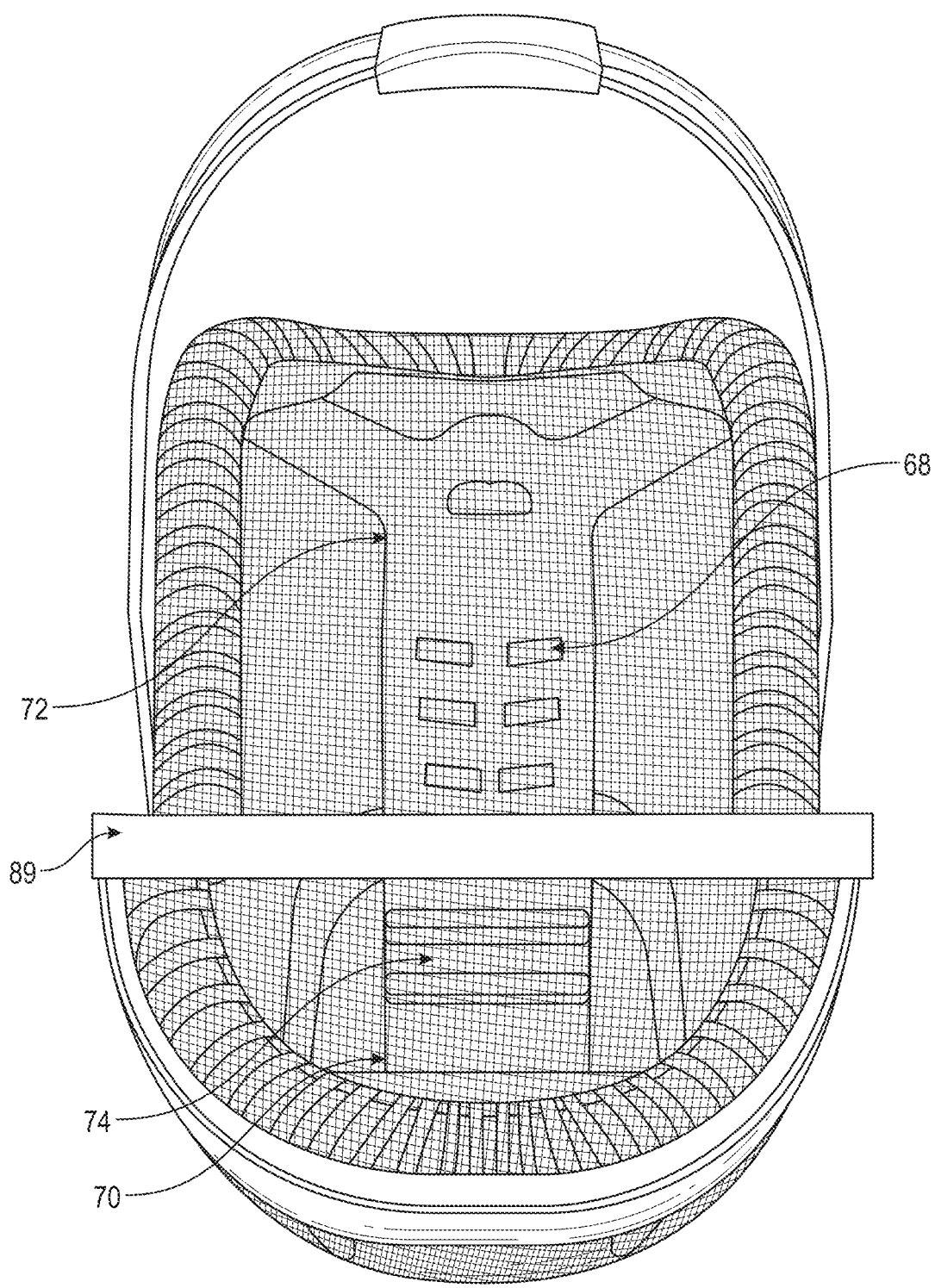
FIG. 6 illustrates a front view of the child safety seat according to an example embodiment.

FIG. 6 illustrates a front view of the child safety seat 10 in accordance with an example embodiment herein. As shown in FIG. 6, the top surface 68 of the support frame 60 may define a concave curvature that is configured to cradle and support the occupant seated therein (see also FIG. 3). In this respect, the side portions 26 may extend over or cover the top surface 68 of the support frame 60 to form the surface on which the occupant is configured to be seated upon in the child safety seat 10. The top surface 68 of the support frame 60 may define the seat portion 70 and the backrest portion 72 of the child safety seat 10. The seat portion 70 and the backrest portion 72 may extend substantially perpendicularly away from an apex 74 at which they meet. In this respect, the apex 74 may be proximate a center of the base portion 22 of child safety seat 10, and the seat portion 70 may extend substantially horizontally from the apex 70. The backrest portion 72 may extend substantially vertically away from the apex 74.

While forming the seat portion 70 and the backrest portion 72, the support frame 60 may be also configured to reduce forces experienced by the occupant of the child safety seat 10 as a result of an impact. In other words, the support frame 60 may provide support and form portions of the child safety seat 10 during a normal use of the child safety seat 10. However, when the amount of force to the child safety seat 10 exceeds a predetermined amount (e.g., as a result of an impact in a crash), the support frame 60 may be configured to deform in order to absorb the force of the impact and thereby reduce the force experienced by the occupant of the child safety seat 10. In other words, the support frame 60 may be configured to support the seat shell 20 and its occupant and provide energy absorption in the event of an impact. As such, the support frame 60 is multi-functional in that the support frame 60 acts as at least a portion of the frame of the child safety seat 10 while functioning as an energy absorber.

Furthermore, the support frame 60 is a multi-directional energy absorber. In this regard, the support frame 60 and the seat shell 20 maintain their position relative to the base assembly 200 and thus the support frame 60 may provide energy absorption irrespective of a position the seat shell 20 is placed in relative to the base assembly 200. Traditional energy absorbers were fixed in a static position between a seat shell and a base assembly thus they were only able to provided energy absorption capabilities in one direction. However, in this example embodiment, the support frame 60 is coupled to the seat shell 20 and move together to a plurality of different positions relative to a fixed base assembly 200. Thus, the support surface 60 is configured to provide energy absorption in each of the plurality of positions the seat shell 20 is moved to with respect to the base assembly 200.

It should be understood that normal use and normal wear and tear of the child safety seat 10 is not enough force to deform the support frame 60. For example, during normal use (i.e., installed in a vehicle and occupied by a child), the amount of force exerted upon the support frame 60 is not sufficient to deform the support frame 60. Similarly, during installation and removal of the child safety seat 10 and during hard-braking events or very minor impacts, the threshold amount of force required to deform the support frame 60 may not be achieved. In this respect, the support frame 60 is configured to deform as a result of a crash, hard impact, etc. (e.g., events that cause force that exceeds a predetermined level).

As shown in any of FIGS. 2-6, the support frame 60 may be a unitary, molded plastic frame that is operably coupled to the top portion 24 and the base portion 22 of the child safety seat 10. In some cases, the support frame 60 may be hollow. However, in accordance with other example embodiments, the support frame 60 may be partially or fully filled with an energy absorbing material such as a gas, a liquid, a gel, a foam, or combination thereof. For example, the support frame 60 may be filled with a plastic or cellular material. Accordingly, the support frame 60 may be formed of a deformable plastic, foam, rubber, or metal and, in some cases, be filled with a plastic, cellular, gas, liquid, gel, or foam material. The material selected to form both the exterior and interior of the support frame 60 may be selected based on their configuration to deform at a predefined force.

Figure 3:
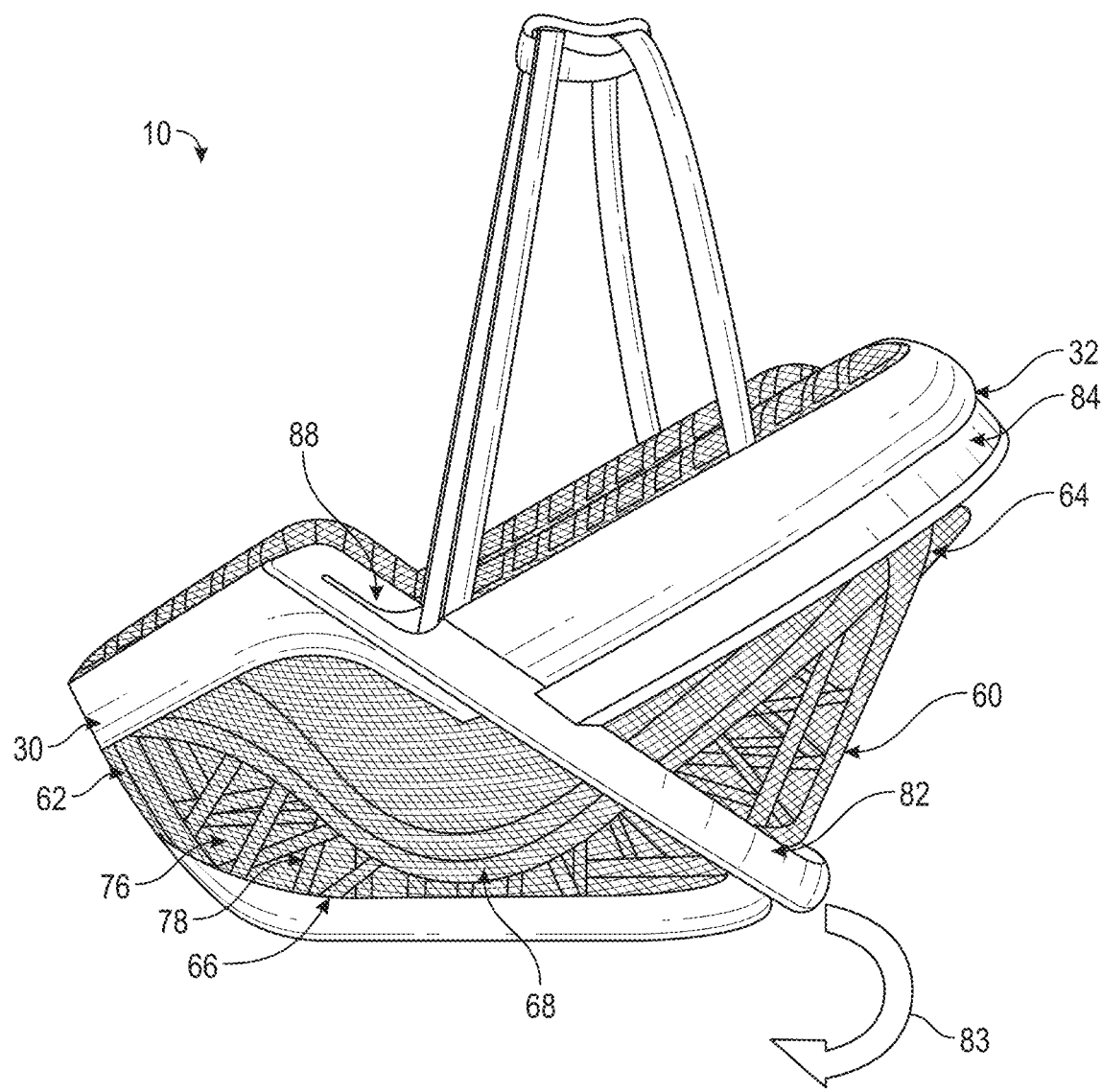
FIG. 3 illustrates a side view of the child safety seat according to an example embodiment.
Figure 4:
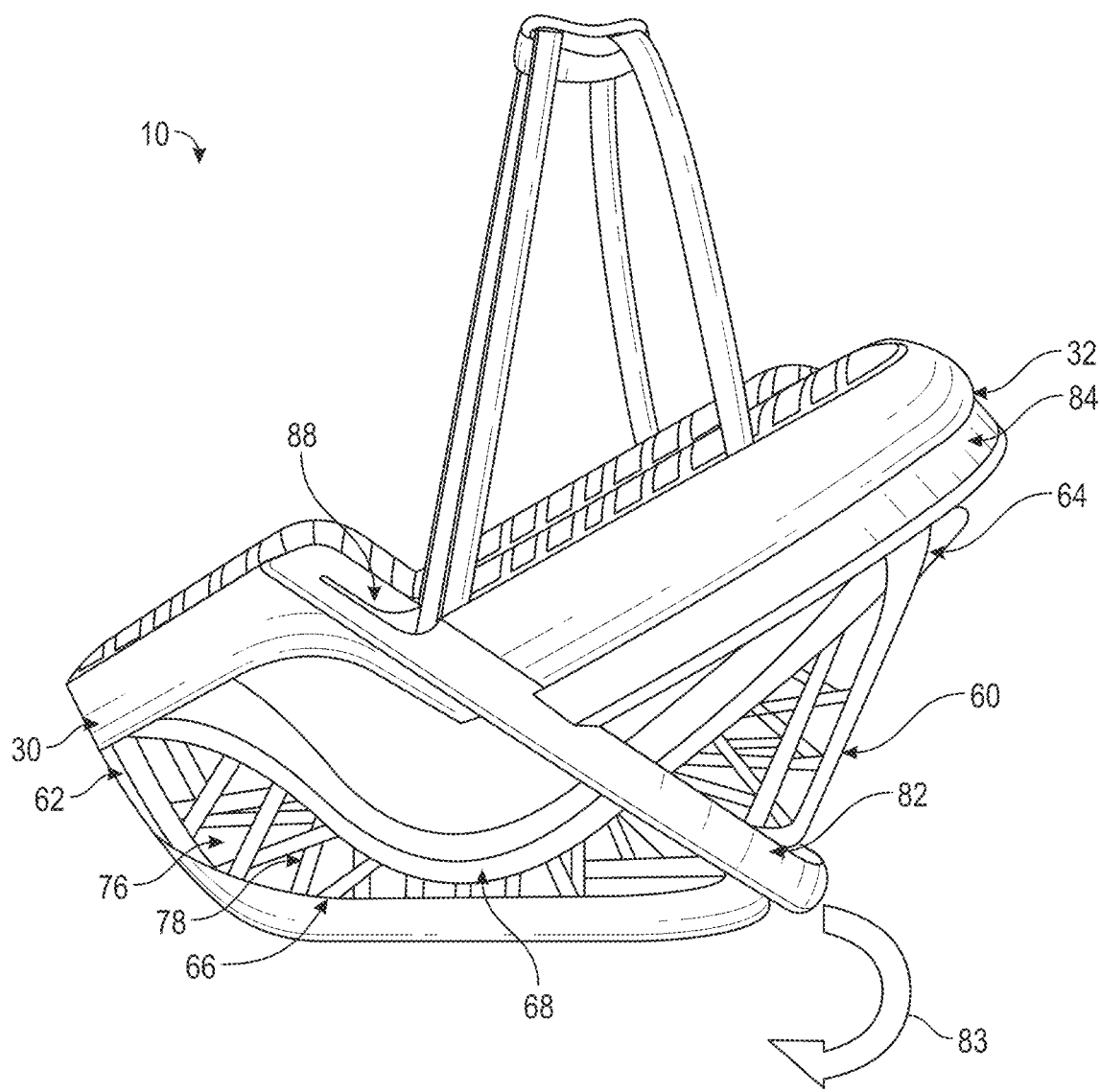
FIG. 4 illustrates a side view of the child safety seat with the fabric side portions removed according to an example embodiment.

As shown in FIGS. 3 and 4, the support frame 60 may have a webbed structure. In this regard, the bottom surface 66 of the support frame 60 may include a plurality of energy absorption cells 76 formed or defined by web members 78. In other words, the energy absorption cells 76 may be disposed between the top surface 68 of the support frame 60 and the base portion 22. The plurality of energy absorption cells 76 are connected or intersect with one another, and in the event of an impact, one or more of the web members 78 may be configured to flex or break before other rigid structures of the seat shell 20 break or flex. While the webbed structure is demonstrated in FIGS. 3 and 4, other example embodiments of the support frame 60 may include the bottom surface 66 of the support frame 60 having a honeycomb structure, a closed cell structure, or the like which, similarly to the webbed structure, are configured to flex or break in the event of an impact before other rigid structures of the seat shell 20.

Figure 7:
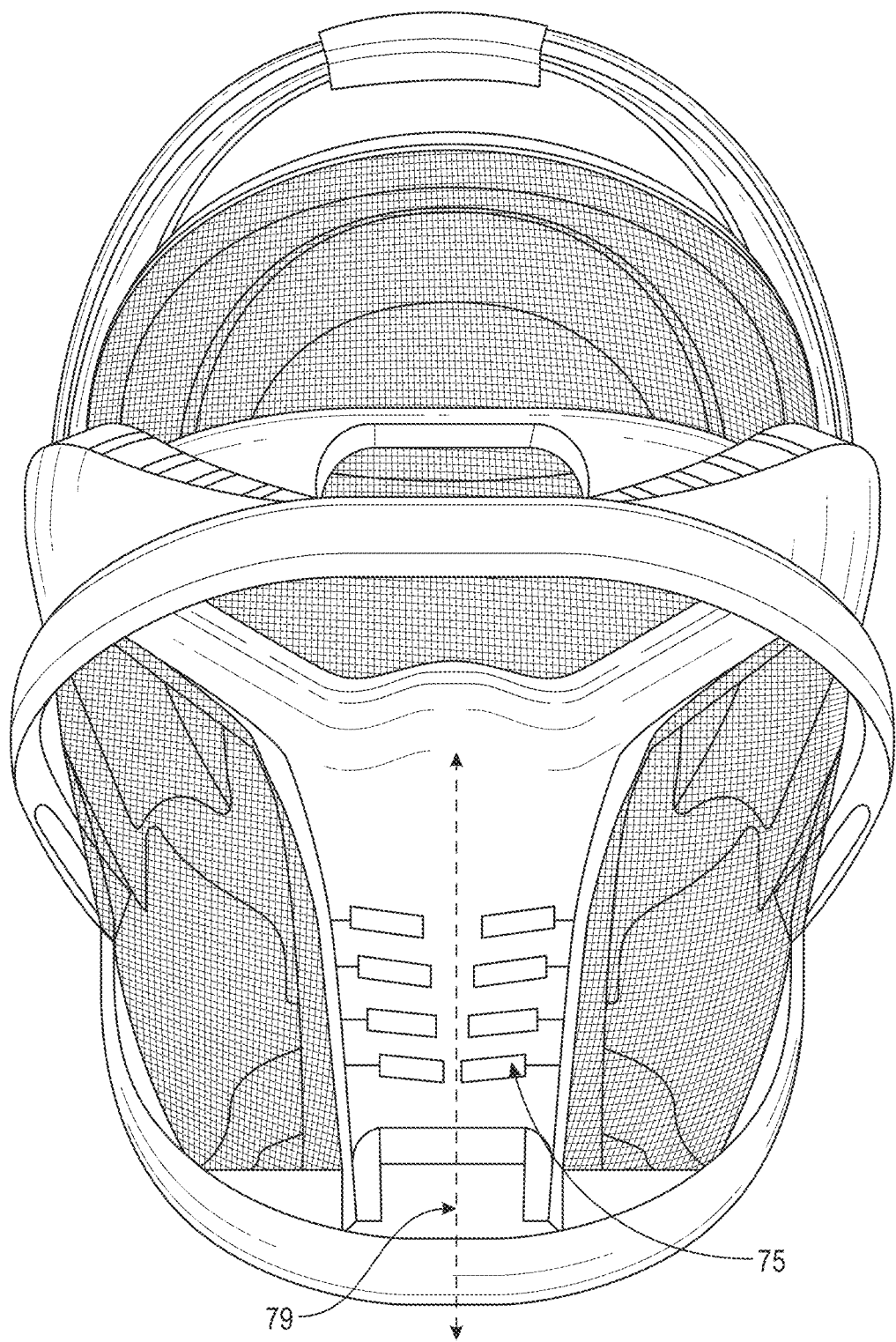
FIG. 7 illustrates a rear view of the child safety seat according to an example embodiment.

FIG. 7 illustrates a rear view of the child safety seat 10 according to an example embodiment. As shown in FIG. 7, the support frame 60 may have an axis 79 extending down a center of the support frame 60. Some embodiments may include the support frame 60 having a single unitary bottom surface 66. However, in other example embodiments, rather than having a single unitary bottom surface 66 forming the plurality of energy absorption cells 76, the support frame 60 may have a first set of energy absorption cells 76 disposed on a first side of the axis 79 and a second set of energy absorption cells 76 disposed on a second side of the axis 79. Furthermore, there may be a hollow space disposed between the first set and second set. In other words, the bottom surface 66 of the support frame 60 that is disposed beneath the seat portion 70 of the support frame 60 may define the first and second set of the energy absorption cells 76. The bottom surface 66 of the support frame 60 that is disposed beneath the backrest portion 72 of the support frame 60 may define a single unitary frame that includes a plurality of horizontally extending slots 75 that are configured to receive a harness of the child safety seat 10.

As further shown in FIGS. 1-4, the child safety 10 may also include a cage frame 80. The cage frame 80 may be operably coupled to the top portion 24 of the seat shell 20 and be configured to provide side impact protection for the child safety seat 10. Similarly to the support frame 60, the cage frame 80 may be formed of a material configured to absorb energy as a result of an impact. In this respect, the cage frame 80 may be a unitary, molded plastic or metal frame that is configured to wrap around an exterior of the child safety seat 10 proximate the backrest portion 72 and absorb energy and deform to reduce the force of the impact experienced by the occupant. The cage frame 80 may be hollow. However, in accordance with other example embodiments, the cage frame 80 may be partially or fully filled with an energy absorbing material such as a gas, a liquid, a gel, a foam, or combination thereof. For example, the cage frame 80 may be filled with a plastic or cellular material. Accordingly, the cage frame 80 may be formed of a deformable plastic, foam, rubber, or metal material and, in some cases, be filled with a plastic, cellular, gas, liquid, gel, or foam material. The material selected to form both the exterior and interior of the cage frame 80 may be selected based on their configuration to deform at a predefined force. For example, the cage frame 80 may be formed of a hollow aluminum and provide more structure and rigidity to the seat shell 20 around a head and back portion of a child seated therein and be configured to deform in order to absorb force in the event of an impact.

The cage frame 80 may be configured to extend between the first side 25 and the second side 27 of the top portion 24 around an exterior portion of the seat shell 20 in order to provide side protection for the child safety seat 10. In accordance with some example embodiments, the cage frame 80 may include a first portion 82 and a second portion 84. In embodiments where the cage frame 80 includes a first portion 82 and a second portion 84, the first portion 82 of the cage frame 80 may extend around the exterior of the seat shell 22 proximate the apex 74 of the support frame 60 between the first side 25 and the second side 27 of the top portion 24. Furthermore, the second portion 82 may extend around the exterior of the seat shell 20 proximate the head portion 39 of the seat shell 22 between respective sides of the first portion 82. By having a first portion 82 and second portion 82 of the cage frame 80, the first portion 82 provides impact protection for each respective side and backrest portion 72 of the child safety seat 10 while the second portion 84 also provides impact protection for each respective side and a head portion 39 of the child safety seat 10. Accordingly, the cage frame 80 effectively provides coverage for a substantial portion of an exterior of the child safety seat 10 in order to absorb force experienced as a result of an impact thereby reducing the effects of the impact on the occupant.

Figure 5:
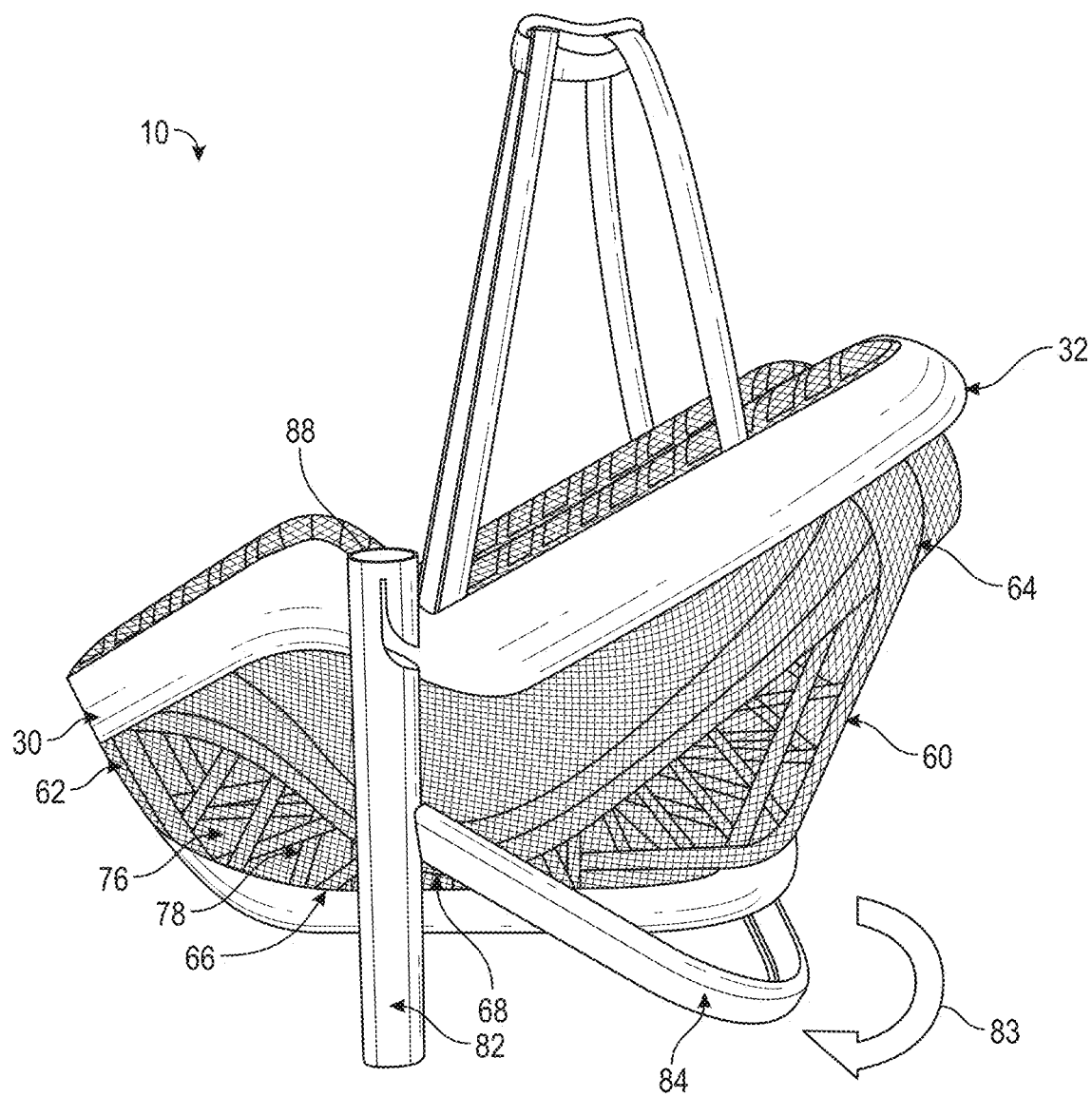
FIG. 5 illustrates a side view of the child safety seat with the cage frame in a disengaged position according to an example embodiment.

In accordance with even further example embodiments, the cage frame 80 may be pivotably attached to each of the first side 25 and second side 27 of the top portion 24 to enable the cage frame 80 to be pivoted between an engaged position (see FIG. 3) and a disengaged position (see FIG. 5). In the engaged position shown in FIG. 3, the cage frame 80 may be configured to provide enhanced side impact protection as discussed above. In the disengaged position shown in FIG. 5, the cage frame 80 may be configured to pivot in the direction of arrow 83 toward and underneath the base portion 22 relative to a normal, sitting position of the child safety seat 10 thereby forming a stand for the child safety seat 10 to rest upon. In this regard, in the disengaged position, the cage frame 80 is configured to elevate the child safety seat 10 off the ground and serve as a stand on which the child safety seat 10 may rest. Furthermore, in the disengaged position when the cage frame 80 forms the stand, the child safety seat 10 may be configured to swing or rotate relative to and between the sides of the cage frame 80 thereby enabling the child safety seat 10 to function as a manual swing as desired. Accordingly, similar to the support frame 60, the cage frame 80 is multifunctional in that the cage frame 80 provides for side impact protection in the engaged position, and in the disengaged position the cage frame 80 forms the stand for elevating the child safety seat 10 off the ground.

In further example embodiments, the cage frame 80 may include a belt guide 88 on each respective side of the cage frame 80. In this respect, the child safety seat 10 may be installed via a base assembly 200 (see FIG. 9) or baseless installation. When it is desired to install the child safety seat 10 without a base assembly 200, the belt guide 88 may be configured to receive a seat belt of the vehicle to secure the child safety seat 10 in the vehicle. As shown in FIG. 3, the belt guide 88 may be disposed on each side of the cage frame 80 proximate the position where the cage frame 80 is operably coupled to the top portion 24. In other words, the belt guides 88 are disposed at an end of the first portion 82 of the cage frame 80 proximate where the cage frame 80 is operably coupled to the top portion 24 or the opening 28 is formed. Because the belt guide 88 is provided on each respective side of the child safety seat 10, one of the belt guides 88 are accessible irrespective of which side of the vehicle the child safety seat 10 is disposed on or desired to be installed in.

The belt guide 88 defines or creates a path 89 (see FIG. 6) for receiving the seat belt of the vehicle. Each of the belt guides 88 define a slot for receiving the seat belt to facilitate placement of the seat belt to install the child safety seat 10 properly in the vehicle in a rear-facing orientation. As shown in FIG. 3, the slot may be substantially u-shaped for receiving the seat belt. In this regard, a lap portion of the seat belt may be routed through the slot of one of the belt guides 88 and then guided along the path 89 and fed through the slot of the other of the belt guides 88 to install the child safety seat 10 in the vehicle. As shown in FIG. 6, the path 89 created by the slots of the belt guides 88 may extend substantially parallel between the slots of the belt guides 88 across a width of the child safety seat 10.

In some cases, the belt guides 88 may include a lock-off device for locking or securing the vehicle or seat belt in the proper placement in order to prevent the seat belt from loosening and thereby ineffectively tensioning the child safety seat 10 to the vehicle seat. In this regard, the lock-off device may be configured to allow movement of the seat belt through the slot in one direction but restricts movement of the seat belt in the other direction. In other words, the lock-off device may be configured to allow the seat belt to be fed or routed through the slot for securing the child safety seat 10 to the vehicle seat while preventing the seat belt from moving in an opposite direction. In some case, the lock-off device may include or be a clamping or pinching member that permits the seat belt to be routed through the slot and clamps or pinches the vehicle belt to secure the seat belt and prevent movement of the seat belt in a direction opposite from the direction the belt is routed through the slot of the belt guide 88.

Figure 8:
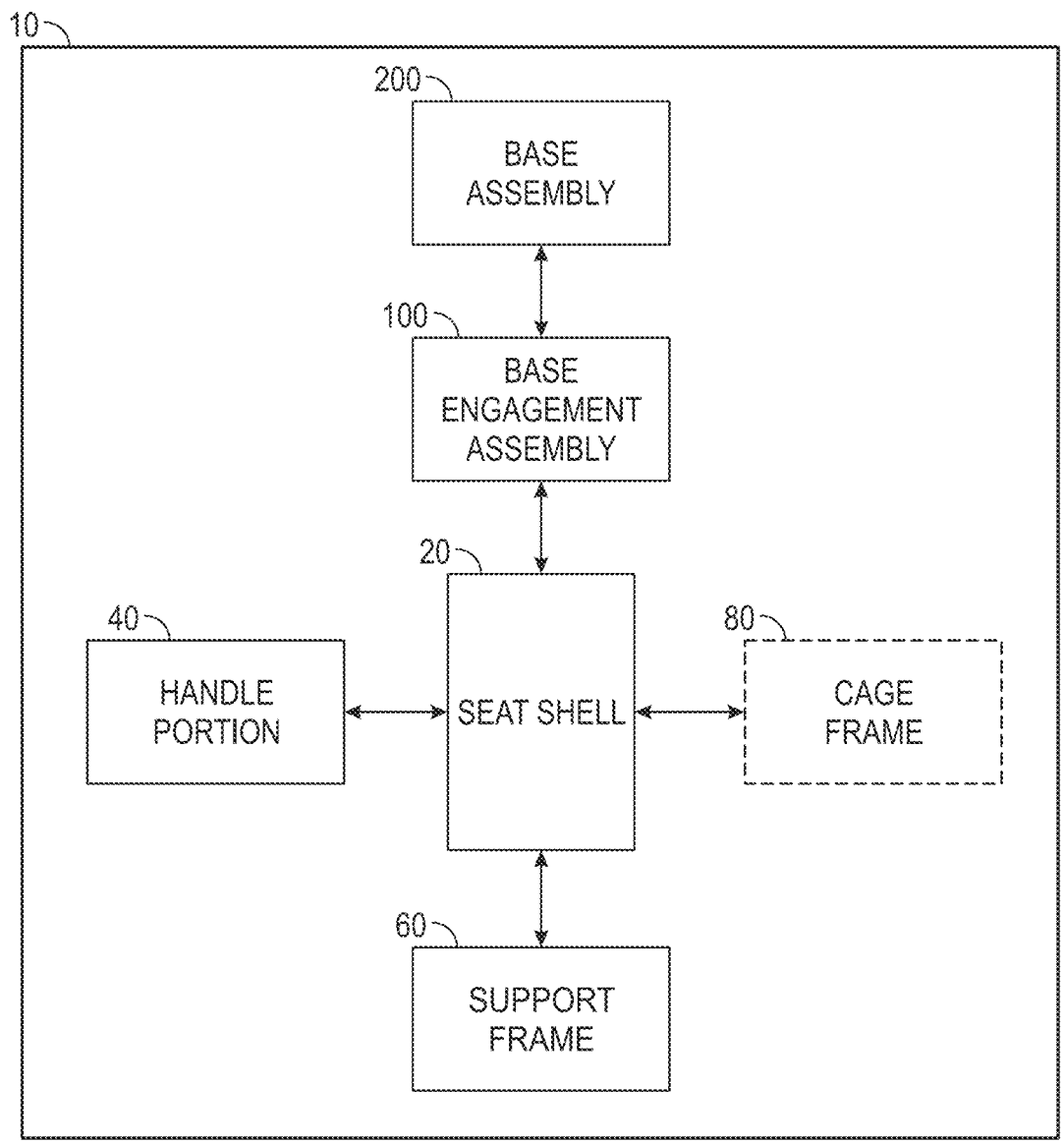
FIG. 8 illustrates a block diagram of a child safety seat according to a further example embodiment.

FIG. 8 illustrates a block diagram of a child safety seat 10 of an even further example embodiment. As shown in FIG. 8, the child safety seat 10 may include the seat shell 20 and the base assembly 200. The base assembly 200 may be configured to be secured to a vehicle seat of a vehicle, and the seat shell 20 may be operably coupled to the base 200 via a base engagement assembly 100, which enables multiple different relative positions to be defined between the seat shell 20 and the base 200. By defining a plurality of rear-facing positions in which the seat shell 20 may engage with the base assembly 200, the child safety seat 10 may be configured to be an extended rear facing child safety seat for infants through toddlers.

Figure 9:
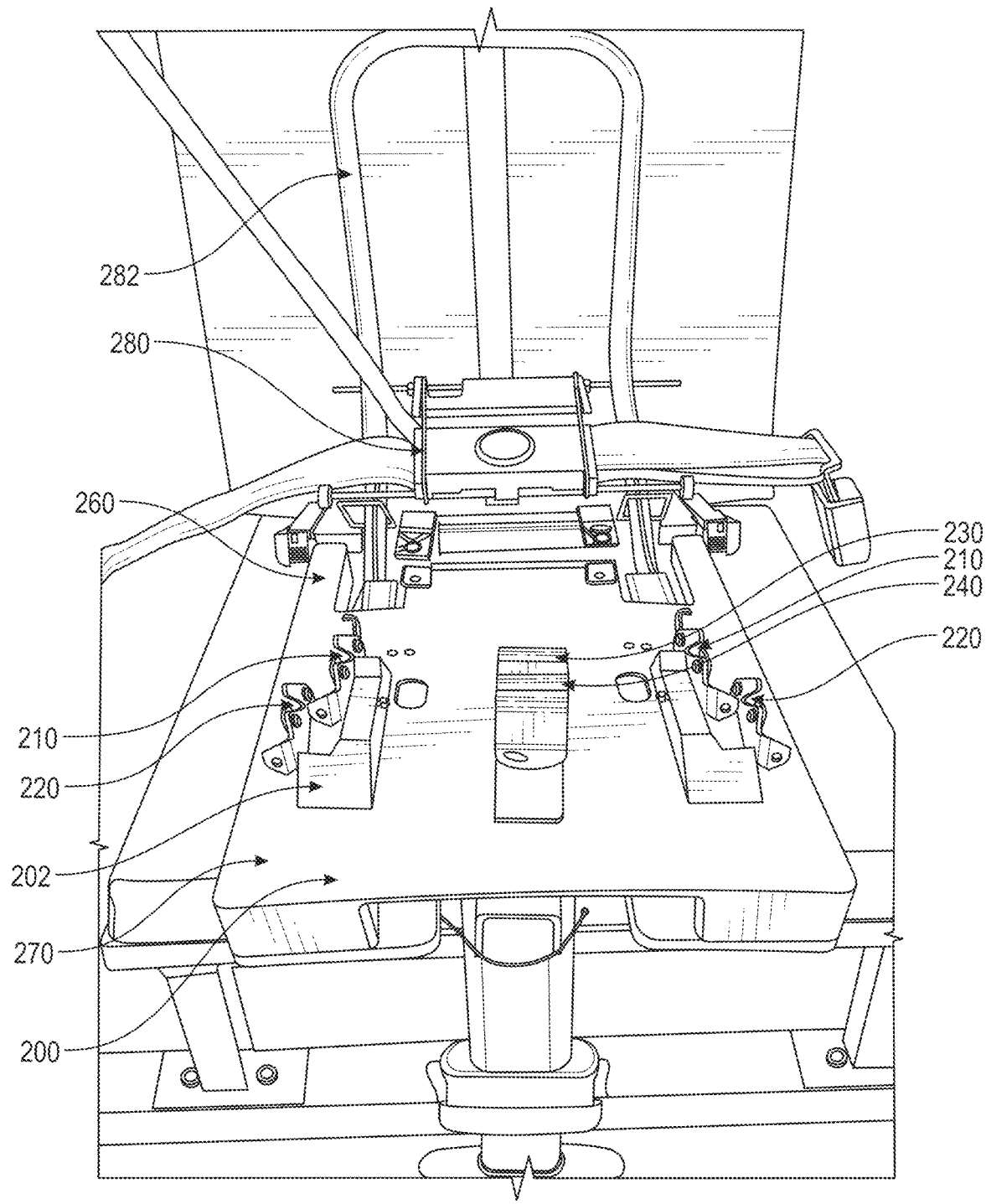
FIG. 9 illustrates a front view of a base assembly of a child safety seat according to an example embodiment.
Figure 10:
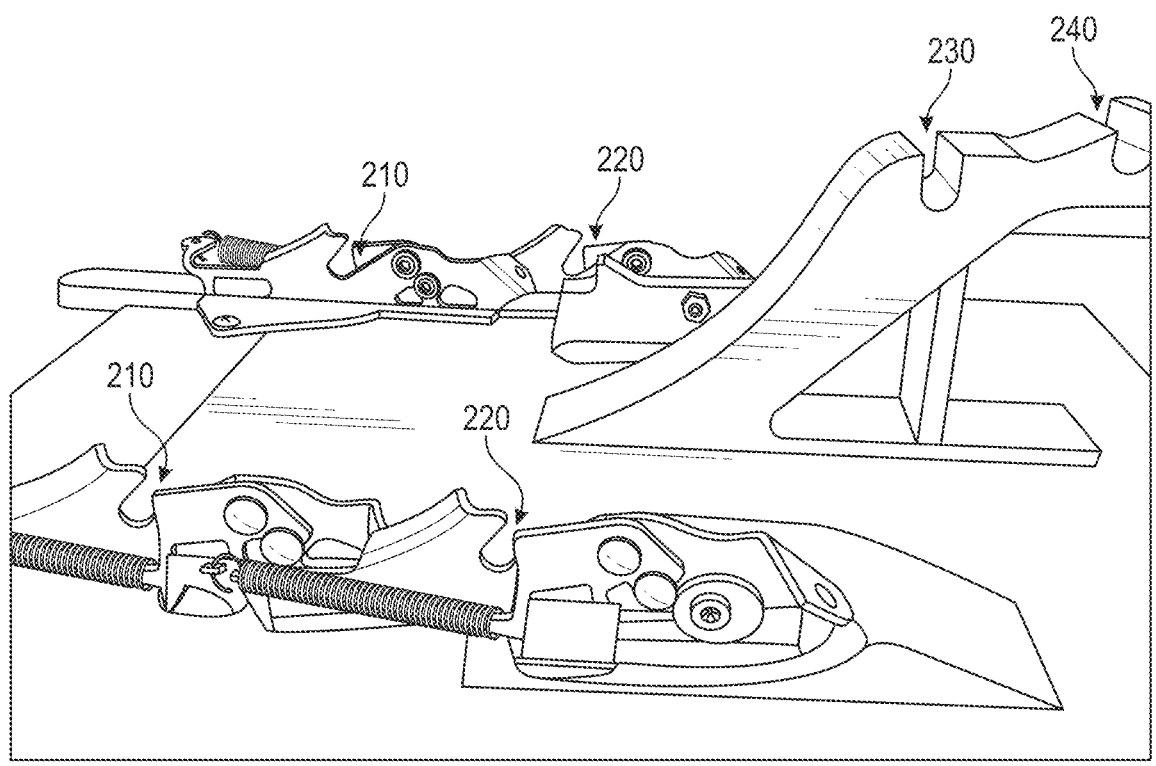
FIG. 10 illustrates a side view of a base assembly of a child safety seat according to an example embodiment.
Figure 11:
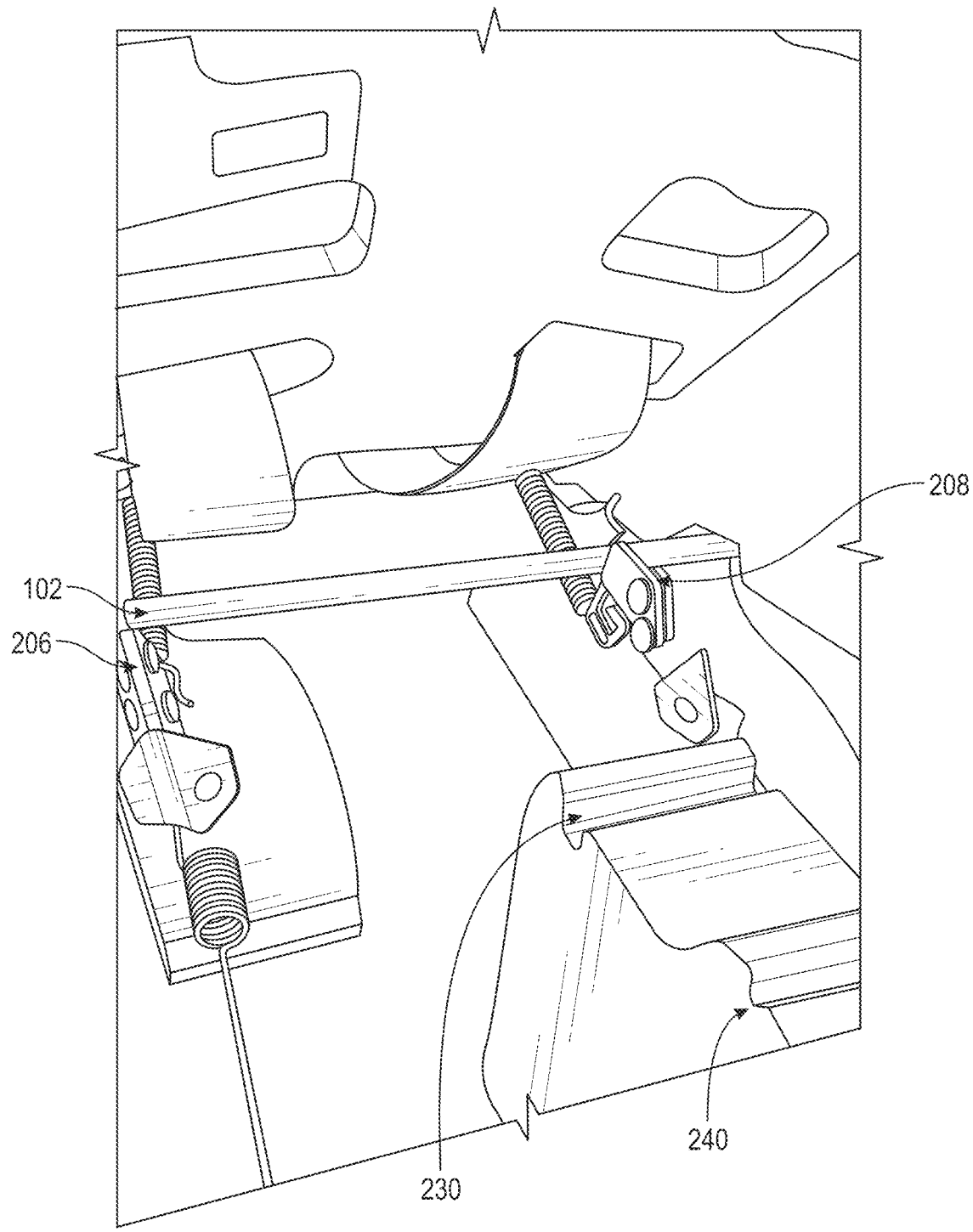
FIG. 11 illustrates a close-up view of a latch of a base assembly of a child safety seat according to an example embodiment.

FIGS. 9-11 illustrate a base assembly 200 according to an example embodiment. FIG. 9 illustrates a perspective view of a base installation assembly 100 disposed on an exterior surface of the base portion 22 of the child safety seat 10. As shown in FIGS. 9-11, the base assembly 200 may include a latch assembly 202. The latch assembly 202 may be configured to receive the base installation assembly 100 of the child safety seat 10 in order to couple and secure the seat shell 20 to the base assembly 200 and thereby be secured in the vehicle seat. As further described below, the latch assembly 202 may include a plurality of latches 210, 220, 230, 240 configured to receive respective portions of the base installation assembly 100 in order to secure the seat shell 20 to the base assembly 200.

Figure 12:
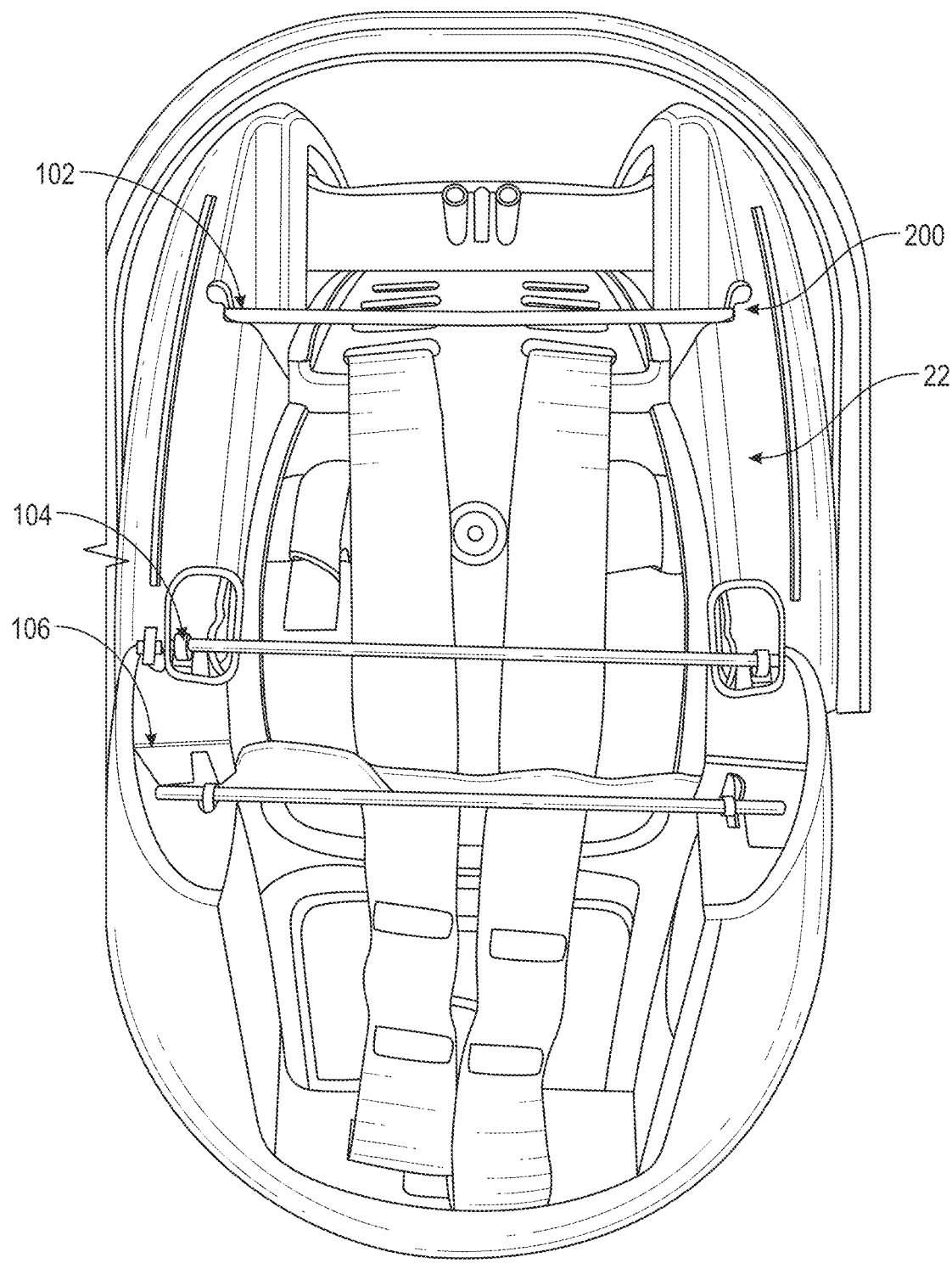
FIG. 12 illustrates a base installation assembly of the child safety seat according to an example embodiment.

As shown in FIG. 12, the base installation assembly 100 may be disposed at or on an exterior surface of the base portion 22 of the seat shell 20. In this respect, the base installation assembly 100 may include a plurality of rods 102, 104, 106 that extend between respective sides of the base portion 22 of the seat shell 20. Each rod 102, 104, 106 may be formed of a metal or plastic material or the like, and as further described below, combinations of the rods 102, 104, and 106 may be engaged with combinations of the latches 210, 220, 230, 240 to engage the seat shell 20 on the base assembly 200 in various rear-facing positions. These positions may include an infant position in which the child safety seat 10 is configured to receive a child weighing about 5-25 pounds (lbs.) comfortably, a baby position in which the child safety seat 10 is configured to seat a child weighing about 25-40 lbs. comfortably, and a toddler position in which the child safety seat 10 is configured to receive a child weighing about 40-60 lbs. comfortably. It should be understood that, while weight is used herein to define the positions in which the seat shell 20 is configured to engage the base assembly 200, height may also be used.

As mentioned above, the latches 210, 220, 230, and 240 may each be configured to receive various combinations of the rods 102, 104, and 106 based on the position the seat shell 20 is being placed in (infant, baby, toddler, etc.) with respect to the base assembly 200. In this regard, each of the latches 210 and 220 may be configured to receive one of the rods 102, 104, or 106 and lock or hold the rod 102, 104, or 106 (see e.g., FIG. 11). As shown in FIG. 11, each of the latches 210 and 220 may include a first locking portion 206 and a second locking portion 208 each disposed on respective sides of the base assembly 208, and each locking portion 206, 208 is configured to receive a respective end of the rod 102, 104, or 106 in order to lock the rod 102, 104, or 106 within the locking portion 206, 208. In this respect, each locking portion 206, 208 may include a recess to receive the rod 102, 104, or 106 and a clasp to close over and lock the rod 102, 104, or 106 when it engages the recess. In some cases, latches 210 and 220 may include only one locking portion 206, 208 disposed proximate a center of the base assembly 200 to receive and lock the rod 102, 104, or 106. Furthermore, as shown in FIG. 9, the latch 210 may to be disposed proximate a front end 260 of the base assembly 200 (the end configured to be proximate the seat back when installed in the vehicle) with latch 220 located closer to a rear end 270 of the base assembly 200 (e.g., the end opposite the front end 260). Furthermore, the latch 220 may be elevated further away from a surface of the base assembly than the latch 210.

Additionally, latches 230 and 240 may also configured to receive one of the rods 102, 104, or 106 and hold the respective rod 102, 104, or 106 therein. In contrast to latches 210 and 220, latches 220 and 230 may be configured to hold the rod 102, 104, or 106 rather than hold and lock the rod 102, 104, or 106 therein. The latches 230, 240 may have a curved structure to merely just support the bar 102, 104, or 106 received within. Furthermore, each of the latches 230 and 240 may be disposed on a pedestal elevated further from the surface of the base assembly than latch 220. In this regard, latch 210 may be located closest to the front end 260 and the surface of the base assembly 200 than latches 220, 230, 240 with each of the latches 220, 230, 240 being disposed higher in elevation and closer to the rear end 270 than the latch located in front of it (relative to the front end 260). In this regard, the further the latch is disposed from the front end 260 of the base assembly 200 the higher in elevation the latch is.

Figure 13:
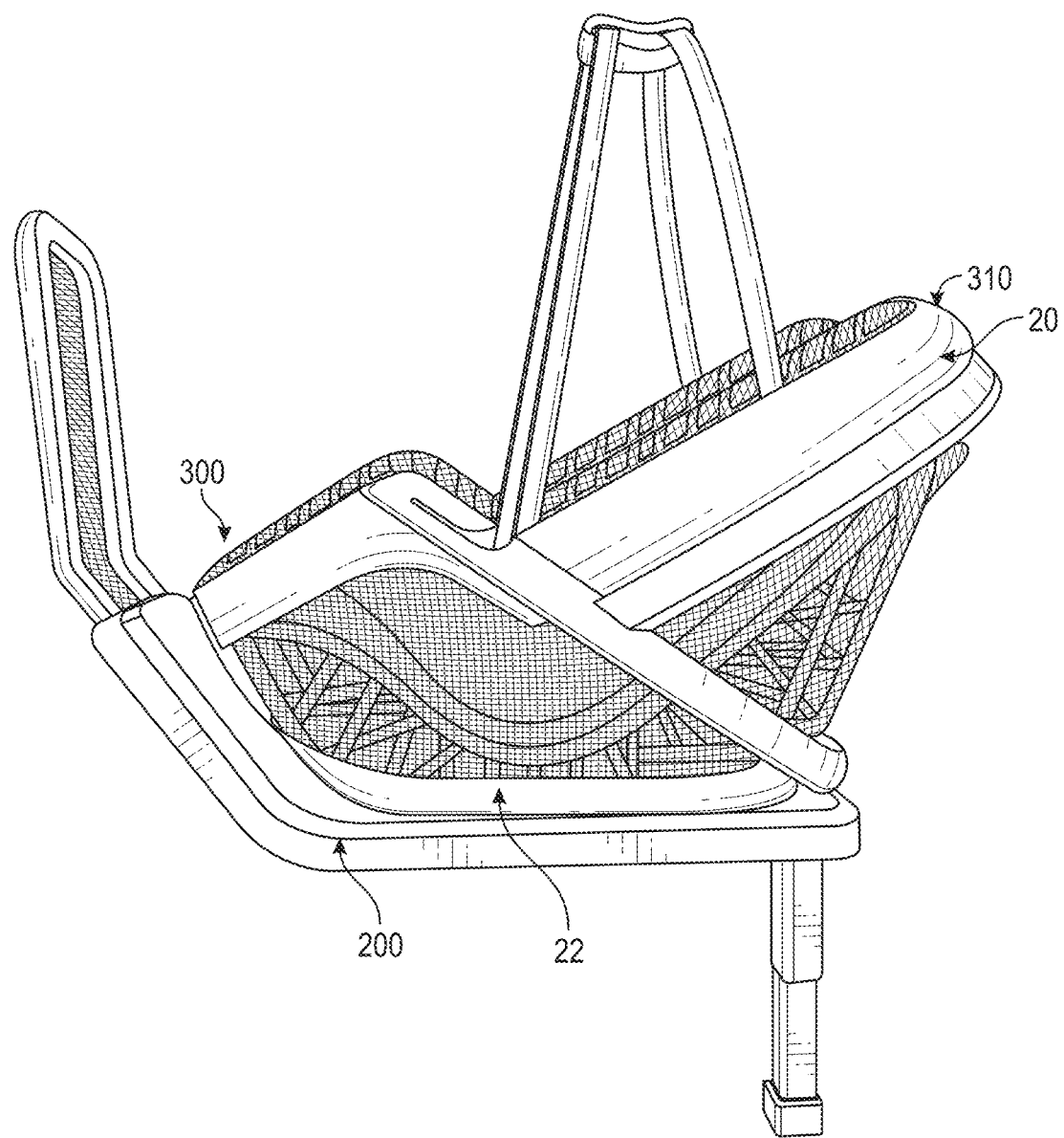
FIG. 13 illustrates a side view of the child safety seat installed in an infant position according to an example embodiment.
Figure 14:
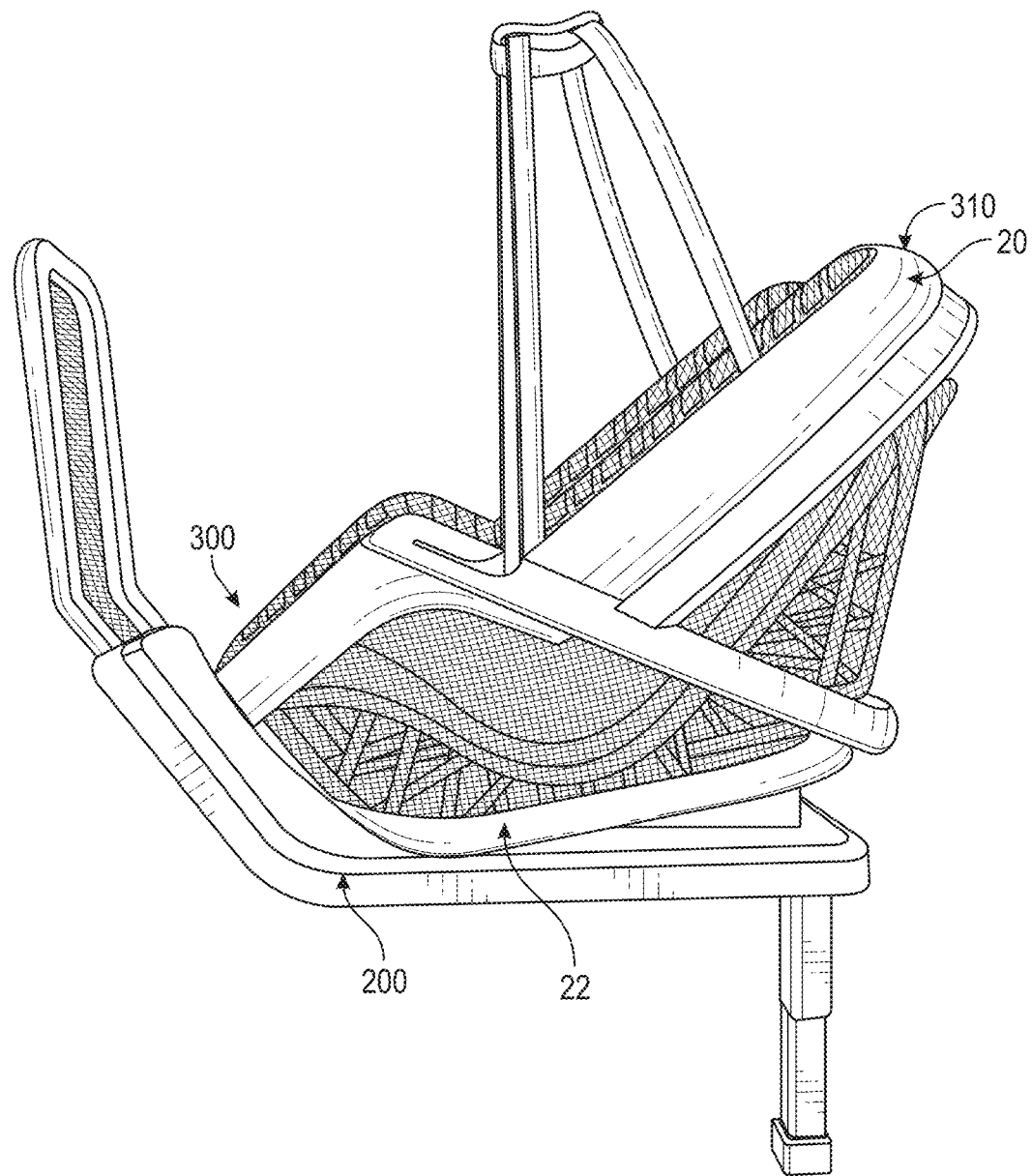
FIG. 14 illustrates a side view of the child safety seat installed in a baby position according to an example embodiment.
Figure 15:
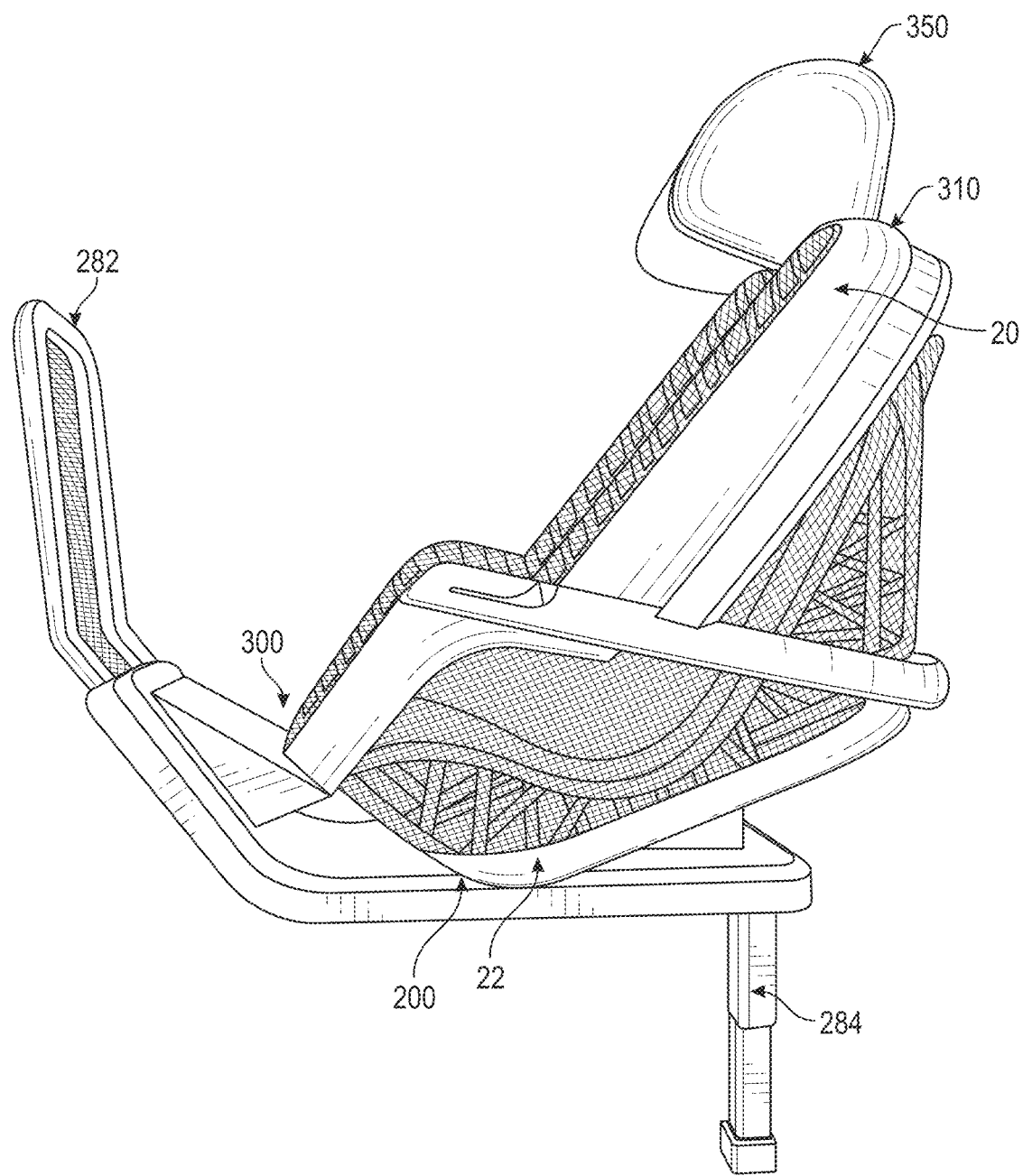
FIG. 15 illustrates a side view of the child safety seat installed in a toddler position according to an example embodiment.

FIGS. 13-15 illustrate various positions of the seat shell 20 engaged with the base assembly 200. Based on the position (e.g., infant, baby, toddler, etc.) the seat shell 20 is to be installed in with respect to the base assembly 200, select latches 210, 220, 230, or 240 of the latch assembly 202 may be configured to receive the rods 102, 104, or 106 of the base installation assembly 100. As shown in FIG. 13, the seat shell 20 is engaged with the base assembly 200 to position the seat shell 20 in a position to receive and comfortably and properly seat an infant weighing approximately 5-25 lbs. In FIG. 13, the base portion 22 of the child safety seat 10 is seated parallel or flush with a surface of the base assembly 200 to ensure proper placement of the infant in the child safety seat 10. To couple and lock the seat shell 20 in the infant position, latch 210 is configured to receive and lock the rod 106 and latch 220 is configured to receive rod and lock the rod 104.

As the child grows and the child safety seat 10 needs to be adjusted to comfortably and properly receive the child, an unlock or release button or clasp on the base assembly 200 may be pressed to unlock both latches 210 and 220 simultaneously to release the rods 104, 106 disposed therein. In this regard as shown in FIG. 14, the seat shell 20 may then be placed in the baby position which slightly elevates the inclination of the seat shell 20 with respect to the base assembly 200. By increasing the inclination of the seat shell 20 with respect to the base assembly 200, the child seated in the seat shell may have more leg room and may be seated in a more upwards position. In this regard, a front end 300 of the child safety seat 10 may be maintained proximate the base assembly 200 while a back end 310 of the child safety seat 10 is elevated from the base assembly 200 to thereby creating more leg room for the child and to sit the child in a more upright sitting position. To couple and lock the seat shell 20 in the baby position, latch 210 is configured to receive and lock the rod 106 and latch 240 is configured to receive rod 102 thereby slightly inclining the seat shell 20 relative to the base assembly 200.

When it is desired to move the seat shell 20 to the toddler position, the unlock or release button or clasp of the base assembly 200 may be pressed or actuated again to unlock latch 210 and then the seat shell 20 may be moved. As shown in FIG. 15, the base portion 22 of the child safety seat 10 is now positioned at an inclined angle relative to the base assembly 200 accommodate a larger child in a more upright position and to provide more legroom for the child. To couple and lock the seat shell 20 in the toddler position, latch 220 is configured to receive and lock the rod 104 and latch 240 is configured to receive rod 102 thereby inclining the seat shell 20 relative to the base assembly 200. Accordingly, the base engagement assembly 100 allows the seat shell 20 to be moved between a plurality of positions to accommodate a child as they grow. Furthermore, when the seat shell 20 is moved to the toddler position, it may desirable to add a headrest 350 to ensure the child is seated comfortably. Accordingly, the seat shell 20 may be configured to receive a detachable headrest 350. Thus, the child safety seat 10 may be an extended rear-facing child seat as the seat shell 20 is configured to accommodate children from infancy through to toddlerhood.

As further shown in FIG. 9, the base assembly 200 may further include a belt tensioning assembly 280 configured to receive the seat belt of the vehicle in order to secure the base assembly 200 to the vehicle seat. In this regard, the belt tensioning assembly 280 may be located on the surface of the base assembly 200 and include a door configured to open and receive the seat belt. In this regard, the door may be configured to pivot and open away from the base assembly 200 and receive a portion of the lap and shoulder section of the vehicle belt. The door is then configured to pivot and close back toward the base assembly 200 and apply tension to the portions of the lap and shoulder section of the vehicle belt received therein. By tensioning the vehicle belt via this "click-tight" belt tensioning assembly 280, the base assembly 200 is secured and tensioned appropriately to the vehicle seat.

As demonstrated in FIGS. 9, 14, and 15, the base assembly may even further include an anti-rebound bar 282 operably coupled to the front end 260 of the base assembly 200. The anti-rebound bar 282 may be configured to reduce rebound movement of the child safety seat 10 as a result of an impact. In some cases, the anti-rebound bar 282 may extend and project upwards from the surface of the base assembly 200 and engage the seat back of the vehicle seat to which the base assembly 200 is secured. In the event of an impact or sudden change in velocity of the vehicle, the anti-rebound bar 282 is configured to retard inertia-induced rotation of the base assembly 200 and the seat shell 20 attached thereto by transmitting rotational force applied to the base assembly 200 into the vehicle seat back. In accordance with even further example embodiments, as shown in FIG. 9 the belt tensioning assembly 280 may be operably coupled to the anti-rebound bar 282.

In accordance with even further example embodiments, the base assembly 200 may also include a load leg 284 (see FIGS. 13-15). The load leg 284 may configured to prevent movement or rotation of the base assembly 200 and the seat shell 20 attached thereto in the event of an impact or crash and in particular improve the stability of the child safety seat 10 in a frontal impact. The load leg 284 may be disposed on a rear end 270 of the base assembly 200. In this regard, the load leg 284 may be disposed on one end of the base assembly 200 with the anti-rebound bar 282 being disposed on the other end of the base assembly 200.

Thus, according to an example embodiment, a child safety seat is provided. The child safety seat may include a seat shell configured to receive and secure a child therein. The seat shell may include a top portion, a base portion, and side portions operably coupling the top portion to the base portion, and the side portions are fabric or mesh. The child safety seat may further include a support frame configured to absorb energy and that defines a seat portion and backrest portion of the child safety seat to enable the child to be secured therein.

In some embodiments, the features described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the support frame may include a plurality of energy absorption cells configured to absorb energy and deform in response to an impact. Alternatively or additionally, a first side of the support frame may include the plurality of energy absorption cells, and a second side of the support frame defines the seat portion and the backrest portion of the child safety seat. Alternatively or additionally, the plurality of energy absorption cells may include a first set of energy absorption cells and a second set of energy absorption cells disposed on respective sides of the seat portion, where each of the first and second set of energy absorption cells are configured to provide energy absorption in each position the seat shell is secured. Alternatively or additionally, a first end of the support surface is operably coupled to a first end of the top portion and a second end of the support surface is operably coupled to a second end of the top portion. Alternatively or additionally, the second side of the support frame defines a concave structure extending between the first end and the second end of the top portion. Alternatively or additionally, the seat portion and the backrest portion of the support frame are joined to each other at an apex and extend away from each other in directions substantially perpendicular to each other. Alternatively or additionally, the fabric or mesh is flexible and configured to conform to the child secured therein. Alternatively or additionally, the child safety seat may further include a cage frame, the cage frame extending around an exterior of the child safety seat and being configured to provide side impact protection. Alternatively or additionally, the cage frame is pivotably connected between a first side and a second side of the top portion and configured to pivot between an engaged position and a disengaged position, in the engaged position, the cage frame is disposed proximate a backrest portion of the support frame and is configured to provide the side impact protection, and in the disengaged position, the cage frame is located proximate the base portion of the child safety seat and is configured to be a stand for elevating the child safety seat off a surface. Alternatively or additionally, the cage frame may further include a belt guide disposed on each respective side of the cage frame, the belt guide being configured to receive a seat belt of a vehicle to secure the child safety seat in the vehicle. Alternatively or additionally, the child safety seat may further include a base engagement assembly, the base engagement assembly being disposed proximate the base portion of the seat shell and configured to operably couple the seat shell to the base assembly. Alternatively or additionally, the base engagement assembly further includes a plurality of rods, where each rod of the plurality of rods defines a position from the plurality of positions in which the seat shell is engageable with the base assembly. Alternatively or additionally, the plurality of rods includes a first rod and a second rod, where the first rod defines an infant position in which the seat shell is engageable with the base assembly, the infant position configured to support the child when weighing about 5-25 pounds, and where the second rod defines a toddler position in which the seat shell is engageable with the base assembly, the toddler position configured to support the child when weighing about 25-55 pounds.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A child safety seat comprising:
   a seat shell configured to receive and secure a child therein, the seat shell comprising a top portion, a base portion, and side portions operably coupling the top portion to the base portion, wherein the side portions are fabric or mesh;
   a support frame configured to absorb energy and defining a seat portion and backrest portion of the child safety seat to enable the child to be secured therein; and
   a cage frame, the cage frame extending around an exterior of the child safety seat and being configured to provide side impact protection; and
   wherein the cage frame further comprises a belt guide disposed on each respective side of the cage frame, the belt guide being configured to receive a seat belt of a vehicle to secure the child safety seat in the vehicle.

2. The child safety seat of claim 1, wherein the support frame comprises a plurality of energy absorption cells configured to absorb energy and deform in response to an impact.

3. The child safety seat of claim 2, wherein a first side of the support frame comprises the plurality of energy absorption cells, and wherein a second side of the support frame defines the seat portion and the backrest portion of the child safety seat.

4. The child safety seat of claim 3, wherein:
   the seat shell is configured to be secured in a plurality of positions; and
   the plurality of energy absorption cells comprise a first set of energy absorption cells and a second set of energy absorption cells disposed on respective sides of the seat portion, wherein each of the first and second set of energy absorption cells are configured to provide energy absorption in each of the plurality of positions the seat shell is secured.

5. The child safety seat of claim 3, wherein a first end of the support frame is operably coupled to a first end of the top portion and a second end of the support frame is operably coupled to a second end of the top portion.

6. The child safety seat of claim 5, wherein the second side of the support frame defines a concave structure extending between the first end and the second end of the top portion.

7. The child safety seat of claim 5, the seat portion and the backrest portion of the support frame are joined to each other at an apex and extend away from each other in directions substantially perpendicular to each other.

8. The child safety seat of claim 1, wherein the fabric or mesh is flexible and configured to conform to the child secured therein.

9. The child safety seat of claim 1, wherein the cage frame is pivotably connected between a first side and a second side of the top portion and configured to pivot between an engaged position and a disengaged position,
   wherein in the engaged position, the cage frame is disposed proximate a backrest portion of the support frame and is configured to provide the side impact protection, and
   wherein in the disengaged position, the cage frame is located proximate the base portion of the child safety seat and is configured to be a stand for elevating the child safety seat off a surface.

10. A child safety seat comprising:
    a seat shell configured to receive and secure a child therein, the seat shell comprising a top portion, a base portion, and side portions operably coupling the top portion to the base portion, wherein the side portions are fabric or mesh;
    a support frame configured to absorb energy and defining a seat portion and backrest portion of the child safety seat to enable the child to be secured therein; and
    a cage frame, the cage frame extending around an exterior of the child safety seat and being configured to provide side impact protection;
    wherein the cage frame further comprises a belt guide disposed on each respective side of the cage frame, the belt guide being configured to receive a seat belt of a vehicle to secure the child safety seat in the vehicle;

wherein the cage frame is pivotably connected between a first side and a second side of the top portion and configured to pivot between an engaged position and a disengaged position, wherein in the engaged position, the cage frame is disposed proximate a backrest portion of the support frame and is configured to provide the side impact protection; and wherein in the disengaged position, the cage frame is located proximate the base portion of the child safety seat and is configured to be a stand for elevating the child safety seat off a surface.

11. The child safety seat of claim 10, wherein the support frame comprises a plurality of energy absorption cells configured to absorb energy and deform in response to an impact.

12. The child safety seat of claim 11, wherein a first side of the support frame comprises the plurality of energy absorption cells, and wherein a second side of the support frame defines the seat portion and the backrest portion of the child safety seat.

13. The child safety seat of claim 12, wherein:
the seat shell is configured to be secured in a plurality of positions; and
the plurality of energy absorption cells comprise a first set of energy absorption cells and a second set of energy absorption cells disposed on respective sides of the seat portion, wherein each of the first and second set of energy absorption cells are configured to provide energy absorption in each of the plurality of positions the seat shell is secured.

14. The child safety seat of claim 12, wherein a first end of the support frame is operably coupled to a first end of the top portion and a second end of the support frame is operably coupled to a second end of the top portion.

15. The child safety seat of claim 14, wherein the second side of the support frame defines a concave structure extending between the first end and the second end of the top portion.

16. The child safety seat of claim 14, the seat portion and the backrest portion of the support frame are joined to each other at an apex and extend away from each other in directions substantially perpendicular to each other.

17. The child safety seat of claim 10, wherein the fabric or mesh is flexible and configured to conform to the child secured therein.

* * * * *